(12) United States Patent
Schmelter et al.

(10) Patent No.: US 11,550,698 B2
(45) Date of Patent: *Jan. 10, 2023

(54) PROVIDING ADDITIONAL STACK TRACE INFORMATION FOR TIME-BASED SAMPLING IN ASYNCHRONOUS EXECUTION ENVIRONMENTS

(71) Applicant: SAP SE, Walldorf (DE)

(72) Inventors: Ralf Schmelter, Wiesloch (DE); Rene Schuenemann, Karlsruhe (DE); Axel Siebenborn, Hambrücken (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,074

(22) Filed: Aug. 10, 2021

(65) Prior Publication Data

US 2021/0365352 A1    Nov. 25, 2021

Related U.S. Application Data

(63) Continuation of application No. 17/328,471, filed on May 24, 2021, now Pat. No. 11,416,375, which is a continuation of application No. 16/740,169, filed on Jan. 10, 2020, now Pat. No. 11,119,891, which is a
(Continued)

(51) Int. Cl.
*G06F 11/00* (2006.01)
*G06F 11/36* (2006.01)
*G06F 9/54* (2006.01)

(52) U.S. Cl.
CPC .......... *G06F 11/3636* (2013.01); *G06F 9/547* (2013.01)

(58) Field of Classification Search
CPC ............... G06F 11/3636; G06F 11/302; G06F 11/3065; G06F 11/362; G06F 11/3612; G06F 9/547
See application file for complete search history.

(56) References Cited

U.S. PATENT DOCUMENTS 7,415,704 B2    8/2008  Schmidt et al.
7,587,721 B2    9/2009  Schmidt et al.
7,614,045 B2   11/2009  Kuck et al.
(Continued)

OTHER PUBLICATIONS

Non-Final Office Action issued in U.S. Appl. No. 16/740,169 dated Oct. 2, 2020, 14 pages.
(Continued)

*Primary Examiner* — Joseph D Manoskey
(74) *Attorney, Agent, or Firm* — Fish & Richardson P.C.

(57) ABSTRACT

The present disclosure describes methods, systems, and computer program products for providing additional stack trace information for time-based sampling (TBS) in asynchronous execution environments. One computer-implemented method includes determining whether time-based sampling is activated to capture a time-based sampling data during execution of a JavaScript function; in response to determining that the time-based sampling is activated to capture the time-based sampling data, determining whether a callback stack trace is active; in response to determining that the callback stack trace is active, loading the callback stack trace; retrieving a current stack trace of the JavaScript function; and saving the loaded callback stack trace and the current stack trace of the JavaScript function as the time-based sampling data.

17 Claims, 4 Drawing Sheets

Related U.S. Application Data continuation of application No. 15/651,301, filed on Jul. 17, 2017, now Pat. No. 10,540,258.

(56) References Cited

U.S. PATENT DOCUMENTS

| | | |
|---|---|---|
| 7,707,583 B2 | 4/2010 | Schmidt et al. |
| 7,725,771 B2 | 5/2010 | Wintergerst et al. |
| 7,788,300 B2 | 8/2010 | Kuck et al. |
| 7,877,640 B2 | 1/2011 | Schmelter |
| 7,904,493 B2 | 3/2011 | Schmelter et al. |
| 7,971,010 B2 | 6/2011 | Schmelter et al. |
| 8,336,033 B2 | 12/2012 | Schmelter et al. |
| 8,356,286 B2 | 1/2013 | Schmelter et al. |
| 8,510,710 B2 | 8/2013 | Harren et al. |
| 8,522,209 B2 | 8/2013 | Wintergerst et al. |
| 8,527,960 B2 | 9/2013 | Schmelter et al. |
| 8,584,098 B2 | 11/2013 | Schmelter et al. |
| 8,601,469 B2 | 12/2013 | Wintergerst et al. |
| 8,656,407 B2 | 2/2014 | Wintergerst et al. |
| 8,667,471 B2 | 3/2014 | Wintergerst et al. |
| 8,839,208 B2 | 9/2014 | Schmelter et al. |
| 8,850,403 B2 | 9/2014 | Wintergerst et al. |
| 9,092,564 B2 | 7/2015 | Wischik et al. |
| 9,117,019 B2 | 8/2015 | Wintergerst et al. |
| 9,129,056 B2 | 9/2015 | Schmelter et al. |
| 9,141,439 B2 | 9/2015 | Scheerer et al. |
| 9,201,759 B2 | 12/2015 | Wintergerst et al. |
| 9,280,444 B2 | 3/2016 | Scheerer et al. |
| 9,430,355 B2 | 8/2016 | Braun et al. |
| 9,483,287 B2 | 11/2016 | Scheerer et al. |
| 9,495,115 B2 | 11/2016 | Schreiber et al. |
| 9,547,537 B2 | 1/2017 | Scheerer et al. |
| 10,540,258 B2 * | 1/2020 | Schmelter ............... G06F 9/547 |
| 11,119,891 B2 * | 9/2021 | Schmelter ........... G06F 11/3636 |
| 11,416,375 B2 * | 8/2022 | Schmelter ........... G06F 11/3636 |
| 2013/0249917 A1 | 9/2013 | Fanning et al. |
| 2013/0283242 A1 | 10/2013 | Gounares |
| 2014/0317606 A1 | 10/2014 | Gataullin et al. |
| 2016/0077853 A1 | 3/2016 | Feng et al. |
| 2016/0147992 A1 | 5/2016 | Zhao et al. |
| 2016/0266998 A1 | 9/2016 | Gautallin et al. |
| 2016/0323160 A1 | 11/2016 | Melikyan et al. |
| 2017/0286263 A1 | 10/2017 | Massicotte |
| 2020/0151086 A1 | 5/2020 | Schmelter et al. |

OTHER PUBLICATIONS

Non-Final Office Action issued in U.S. Appl. No. 17/328,471 dated Oct. 26, 2021, 12 pages.

* cited by examiner

```
function h() {
    calculatePi();
}
function g() {
    process.nextTick(h);
    process.nextTick(f);
}
function f() {
    setTimeout(g, 1);
}
f();
```

FIG. 1

PROVIDING ADDITIONAL STACK TRACE INFORMATION FOR TIME-BASED SAMPLING IN ASYNCHRONOUS EXECUTION ENVIRONMENTS

CLAIM OF PRIORITY

This application claims priority under 35 USC § 120 to U.S. patent application Ser. No. 17/328,471, filed on May 24, 2021 titled "PROVIDING ADDITIONAL STACK TRACE INFORMATION FOR TIME-BASED SAMPLING IN ASYNCHRONOUS EXECUTION ENVIRONMENTS"; which claims priority under 35 USC § 120 to U.S. patent application Ser. No. 16/740,169, filed on Jan. 10, 2020 titled "PROVIDING ADDITIONAL STACK TRACE INFORMATION FOR TIME-BASED SAMPLING IN ASYNCHRONOUS EXECUTION ENVIRONMENTS"; which claims priority under 35 USC § 120 to U.S. patent application Ser. No. 15/651,301, filed on Jul. 17, 2017 titled "PROVIDING ADDITIONAL STACK TRACE INFORMATION FOR TIME-BASED SAMPLING IN ASYNCHRONOUS EXECUTION ENVIRONMENTS"; the entire contents of each and all noted above are hereby incorporated by reference.

BACKGROUND

Node.js is a JavaScript run-time environment for executing JavaScript code on a server side. Historically, JavaScript was used primarily for client-side scripting, in which scripts written in JavaScript are embedded in a webpage's HyperText Markup Language (HTML), to be run on a client side by a JavaScript engine in a user's web browser. Node.js enables JavaScript to be used for server-side scripting, and runs scripts on a server side to produce dynamic web page content before the page is sent to the user's web browser. Node.js is based on Google V8 JavaScript engine.

Typically, a JavaScript-based server only has a single thread. Unlike a JAVA server has multiple threads for parallel processing of multiple processes simultaneously, a JavaScript-based server executes multiple processes asynchronously. Node.js is an asynchronous execution platform. In an asynchronous execution environment, when a blocking operation (for example, input/output (I/O)) is going to be executed, the blocking operation itself is executed asynchronously at a later time. For example, the blocking operation itself is executed when no other operations needed to be performed and the blocking operation itself can be performed without blocking (for example, because the needed bytes have already been read from a file).

SUMMARY

The present disclosure describes providing additional stack trace information for time-based sampling (TBS) in asynchronous execution environments.

In an implementation, one computer-implemented method includes determining whether time-based sampling is activated to capture a time-based sampling data during execution of a JavaScript function; in response to determining that the time-based sampling is activated to capture the time-based sampling data, determining whether a callback stack trace is active; in response to determining that the callback stack trace is active, loading the callback stack trace; retrieving a current stack trace of the JavaScript function; and saving the loaded callback stack trace and the current stack trace of the JavaScript function as the time-based sampling data.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, it helps accurately identify performance bottlenecks of a process. Second, it is highly configurable to achieve a desired balance between informative output and computational efficiency. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 1 is a plot illustrating an example code for an asynchronous work, according to an implementation.

Like reference numbers and designations in the various drawings indicate like elements.

DETAILED DESCRIPTION

Figure 2:
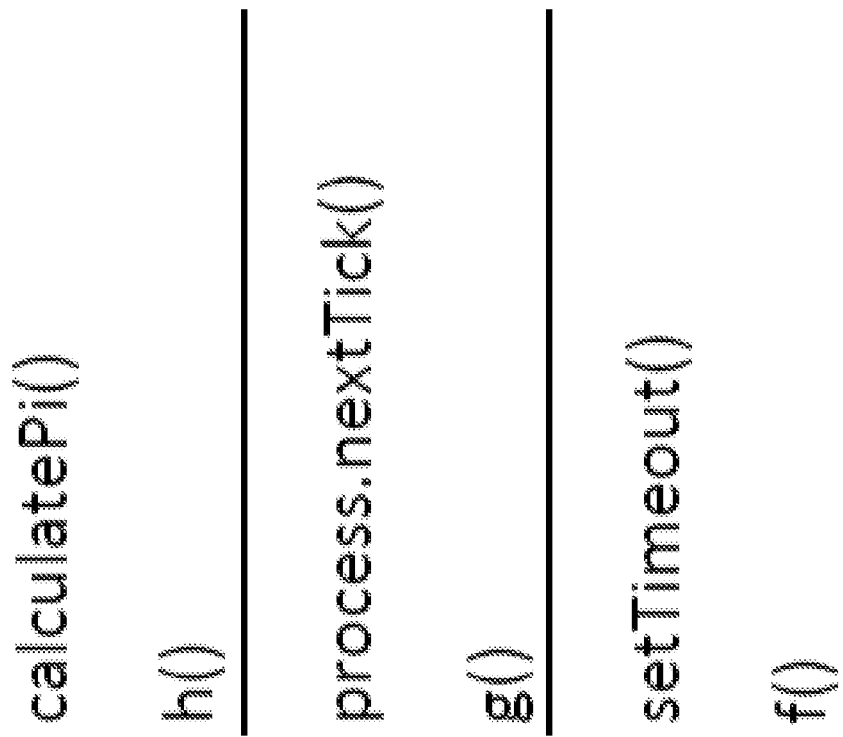
FIG. 2 is a plot illustrating an example stack trace during time-based sampling (TBS) in the calculatePi( ) method 112 shown in FIG. 1, according to an implementation.

The following detailed description describes providing additional stack trace information for time-based sampling (TBS) in asynchronous execution environments, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

For performance analysis, for example, to debug or identify sources of latency in a program's execution, Node.js comes with a time-based sampling (TBS). TBS can be used as a profiling method that can be used, for example, to find reasons for performance bottlenecks. TBS typically has only a small to moderate performance impact on the running application and therefore can be enabled even in a production scenario. In some implementations, the TBS works by suspending the virtual machine (VM) at regular intervals and inspecting what the VM is doing. What the VM "is doing" is usually determined by the current stack trace. A stack trace includes a list of functions or method calls from a point when the application is started to a point where an exception is thrown. The top of the stack is the function that is currently running and the functions below are functions that calls the currently-running function (directly or indirectly).

As an example, if method A( ) is found to be on top 80% of the time, it can be concluded that either the method A( ) itself is too slow or it is called too much by other methods. The latter case can be a problem in an asynchronous model. For example, if method B( ) requests an asynchronous work to be done, the asynchronous work itself will be done later. So when the TBS sample is taken during the asynchronous work, it will only see a stack trace representing that asynchronous work. There is generally no way to link the code requesting the asynchronous work and the asynchronous work itself together, so method BO would not be found as the culprit in the example.

Example techniques are described to solve the problem and to accurately identify the performance bottleneck. The example techniques do not add overhead when the VM is not being profiled. In some implementations, the VM can be instrumented to inform when an asynchronous work is requested. Typically, an asynchronous work is dispatched using standard JavaScript and node.js features, which can be intercepted. In an example asynchronous execution environment such as node.js, tasks are often done by callback functions. A callback function (also referred to as a callback) is a function called at the completion of a given task. A callback function prevents blocking and allows other codes to be run in the meantime. When profiling an asynchronous work using TBS, the code requesting the callback functions is not visible. As a result, one might be able to see, for example, that all the work is done in callback function CO, but one does not know which function requested the callback function CO.

Example techniques are described to enable correlating the callback invocations with the code that requested it, for example, using stack traces to track the callback flow when TBS is enabled. Example techniques effectively create a stack trace that tracks up to a root function that (directly or indirectly) calls for a currently-executed function captured by a TBS snapshot so that each function in the stack trace can be identified and attributed.

In some implementations, the stack trace can be stored in the memory or database as a separate object. In some implementations, the stack trace can be stored or output in a human-readable format for better user experience. In some implementations, the stack trace can be released, for example, as soon as the callback function is returned to free up the storage space, or can be kept for a certain duration for archive or other purposed. In some implementations, the depth of the stack trace is configurable, for example, based on available memory size, the CPU utilization, or a combination of these and other factors. In some implementations, the properties of the stack trace are configured to achieve one or more design goal, such as, striking a balance between a detailed, informative stack trace, a storage load of the system, and an interruption of the Node.js (JavaScript) execution.

In some implementations, the TBS can be called at 3 instances: (1) when the asynchronous request is requested (REQUEST step), (2) when the asynchronous request is invoked (INVOKE step); or (3) when the invocation of the asynchronous request has ended (END step).

When TBS is enabled during runtime, a stack trace can be taken at the REQUEST step and recorded (for example, by associating it to the specific request).

When a TBS sample is taken during the INVOKE step, rather than the current stack trace, the stack trace recorded during the REQUEST step for the request can be recorded. In this way, the code requested the current method can be identified and thus can be billed too. If the REQUEST step itself was done during an INVOKE step, the current stack trace at the INVOKE step will be attached and recorded too (and so on, until a certain limit). And when the END step is done, the associated stack trace can be released.

FIG. 1 is a plot illustrating an example code for an asynchronous work 100, according to an implementation. The method h( ) 110 is assumed to do the real work using the method calculatePi( ) 112. When the method setTimeout( ) 132 in function f( ) 130 when f( ) is called at 140, the current stack trace can be captured so as to indicate that when go 134 is executed later, it was triggered by function f( ) 130. Analogously, the stack when h( ) is supplied as the callback to process.nextTick( ) 122 can be captured.

FIG. 2 is a plot illustrating an example stack trace 200 during TBS in the calculatePi( ) method 112 shown in FIG. 1, according to an implementation. The stack trace 200 includes stacks (with the top of stack method at the top): calculatePi( ) h( ), process.nextTick( ) go, setTimeout( ) and f( ) As a result, any work done in h( ) to go and f( ) can be attributed.

In some implementations, the example TBS profiling techniques by tracking the stacks in the described way can be switched on and off. For example, the example TBS profiling techniques can be enabled only during the TBS run for efficiency, or the example TBS profiling techniques can be enabled by default.

In some implementations, since tracking a stack trace in the REQUEST step can take some time, all samples that are requested during the stack trace creation phase can be discarded. In this way, the performance impact of requesting asynchronous work is not overestimated.

Figure 3:
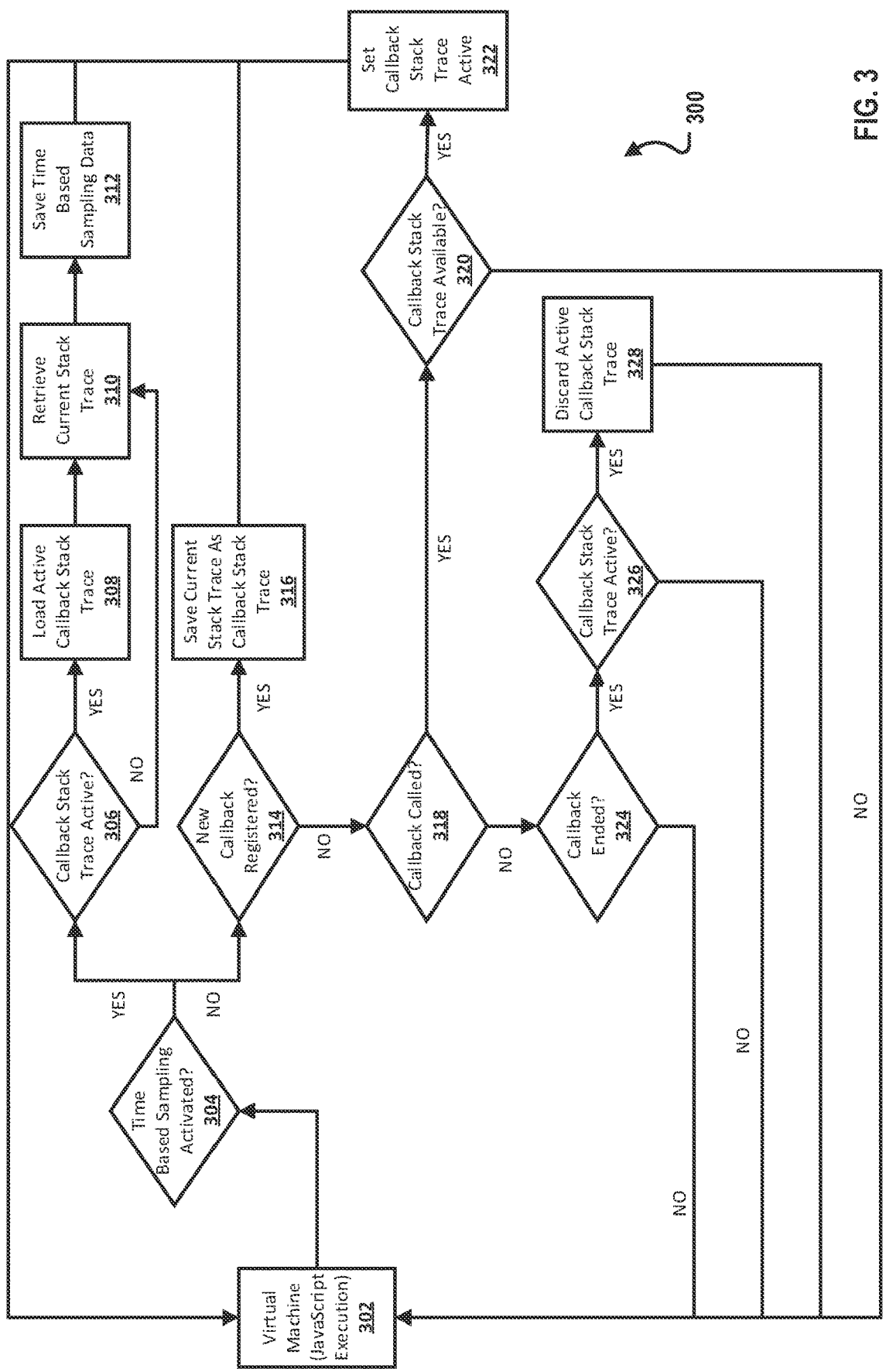
FIG. 3 is a flowchart illustrating an example method for providing additional stack trace information for time-based sampling (TBS) in asynchronous execution environments, according to an implementation.

FIG. 3 is a flowchart of an example method 300 for providing additional stack trace information for time-based sampling (TBS) in asynchronous execution environments, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At 302, the Virtual Machine (VM) is executed. For example, the VM is executed for executing a JavaScript function. The JavaScript function can include an asynchronous function execute in a Node.js system. From 302, method 302 proceeds to 304.

At 304, a determination is made as to whether time-based sampling is activated to capture a sample (that is, time-based sampling data) during execution of the JavaScript function. If it is determined that time-based sampling is activated to capture the sample, method 300 proceeds to 306. Otherwise, if it is determined that time-based sampling is not activated to capture the sample, method 300 proceeds to 314.

At 306, a determination is made as to whether a callback stack trace is active. If it is determined that a callback stack trace is active, method 300 proceeds to 308. Otherwise, if it is determined that a callback stack trace is not active, method 300 proceeds to 310, thus skipping 308.

At 308, the callback stack trace is loaded. From 308, method 300 proceeds to 310.

At 310, the current stack trace of the JavaScript function is retrieved. From 310, method 300 proceeds to 312.

At 312, the loaded callback stack trace and the current stack trace of the JavaScript function is saved as the time-based sampling data. From 312, method 300 proceeds back to 302.

At 314, a determination is made as to whether a new callback has been registered during VM execution (for example, during the execution of the JavaScript function). If it is determined that a new callback has been registered, method 300 proceeds to 316. Otherwise, if it is determined that no new callback has been registered, method 300 proceeds to 318.

At 316, the current stack trace is saved as the callback stack trace. From 316, method 300 proceeds back to 302 to continue the VM execution. In some implementations, saving the current stack trace as the callback stack trace includes appending or otherwise attaching the current stack trace to previously saved callback stack trace, for example, in a similar manner as the example shown in FIG. 2. In some implementations, saving the current stack trace as the callback stack trace includes using the current stack trace to overwrite some or all of previously saved callback stack trace, for example, in the case that the previously saved callback stack trace has reached the configured depth of the stack trace.

At 318, a determination is made as to whether a callback has been called during VM execution. In some implementations, the callback has been called by an asynchronous JavaScript function that is currently executed by the VM. If it is determined that a callback has been called, method 300 proceeds to 320. Otherwise, if it is determined that no callback has been called, method 300 proceeds to 324.

At 320, a determination is made as to whether a callback stack trace is available. If it is determined that a callback stack trace is available, method 300 proceeds to 322. Otherwise, if it is determined that no callback stack trace is available, method 300 proceeds back to 302.

At 322, the available callback stack trace is set to be active. In some implementations, setting the available callback stack trace to be active includes associating the callback stack trace with the function (for example, an asynchronous JavaScript function) that calls the callback. In some implementations, setting a callback active includes storing the callback in a data structure (for example, a global data structure), where the data structure implicitly identifies the callback as active. In some implementations, the data structure could also represent a chain of active callbacks, for example, when a new callback is registered inside a called callback function. From 322, method 300 proceeds back to 302.

At 324, a determination is made as to whether a callback has been ended during the VM execution. If it is determined that a callback has been ended, method 300 proceeds to 326. Otherwise, if it is determined that no callback has been ended, method 300 proceeds back to 302.

At 326, a determination is made as to whether a callback stack trace has been set to be active. If it is determined that a callback stack trace has been set to active, method 300 proceeds to 328. Otherwise, if it is determined that no callback stack trace has been set to active, method 300 proceeds back to 302.

At 328, the active callback stack trace is discarded or cleared. In some implementations, discarding or clearing the active callback stack trace includes discarding the saved stack trace of the registered callback that has been ended. In some implementations, clearing the active callback includes clearing the data structure that represents the active state of the callback, for example, by removing the last element of the active callbacks chain. As an example, using Node.js clearing functions, clearing the active callback can be implemented by marking the callback object as free, which then will be freed by a memory garbage collector at a later point in time. From 328, method 300 proceeds back to 302.

Figure 4:
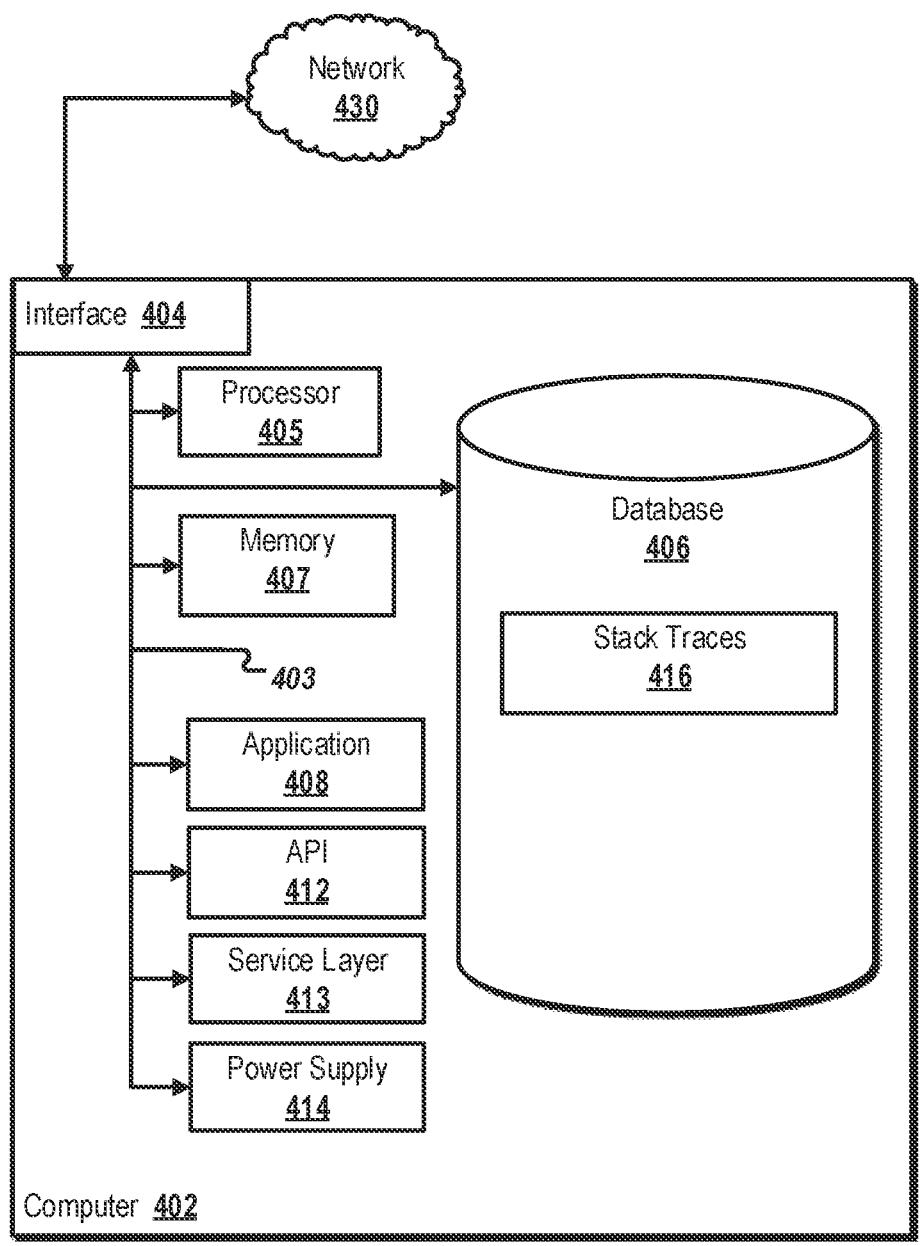
FIG. 4 is a block diagram illustrating an example computer system used to provide computational functionalities associated with described algorithms, methods, functions, processes, flows, and procedures as described in the instant disclosure, according to an implementation.

FIG. 4 is a block diagram of an example computer system 400 used to provide computational functionalities associated with described algorithms, methods, functions, processes, flows, and procedures, as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. For example, the computer 402 can serve as a node.js server operable to execute asynchronous work and to provide additional stack trace information for time-based sampling (TBS) in asynchronous execution environments. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds previously described stake traces 416.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like, storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method includes determining whether time-based sampling is activated to capture a time-based sampling data during execution of a JavaScript function; in response to determining that the time-based sampling is activated to capture the time-based sampling data, determining whether a callback stack trace is active; in response to determining that the callback stack trace is active, loading the callback stack trace; retrieving a current stack trace of the JavaScript function; and saving the loaded callback stack trace and the current stack trace of the JavaScript function as the time-based sampling data.

The foregoing and other described implementations can each, optionally, include one or more of the following features:

A first feature, combinable with any of the following features, wherein the JavaScript function includes an asynchronous function execute in a Node.js system.

A second feature, combinable with any of the previous or following features, including in response to determining that the callback stack trace is not active, skipping loading the callback stack trace.

A third feature, combinable with any of the previous or following features, determining whether a new callback is registered during the execution of the JavaScript function; and in response to determining that the new callback is registered during the execution of the JavaScript function, saving a current stack trace as the callback stack trace.

A fourth feature, combinable with any of the previous or following features, wherein saving the current stack trace as the callback stack trace includes attaching the current stack trace to previously saved callback stack trace.

A fifth feature, combinable with any of the previous or following features, including determining whether a registered callback is called; in response to determining that the registered callback is called by an asynchronous JavaScript function, determining whether a callback stack trace of the registered callback is available; and in response to determining that the callback stack trace of the registered callback is available, setting the callback stack trace as active by associating the callback stack trace with the asynchronous JavaScript function.

A sixth feature, combinable with any of the previous or following features, including determining whether a registered callback is ended; in response to determining that the registered callback is ended, determining whether the callback stack trace is active; and in response to determining that the callback stack trace is active, discarding saved stack trace of the registered callback that is ended.

In a second implementation, a non-transitory, computer-readable medium storing one or more instructions executable by a computer system to perform operations including: determining whether time-based sampling is activated to capture a time-based sampling data during execution of a JavaScript function; in response to determining that the time-based sampling is activated to capture the time-based sampling data, determining whether a callback stack trace is active; in response to determining that the callback stack trace is active, loading the callback stack trace; retrieving a current stack trace of the JavaScript function; and saving the loaded callback stack trace and the current stack trace of the JavaScript function as the time-based sampling data.

The foregoing and other described implementations can each, optionally, include one or more of the following features:

A first feature, combinable with any of the following features, wherein the JavaScript function includes an asynchronous function execute in a Node.js system.

A second feature, combinable with any of the previous or following features, wherein the operations include in response to determining that the callback stack trace is not active, skipping loading the callback stack trace.

A third feature, combinable with any of the previous or following features, wherein the operations include determining whether a new callback is registered during the execution of the JavaScript function; and in response to determining that the new callback is registered during the execution of the JavaScript function, saving a current stack trace as the callback stack trace.

A fourth feature, combinable with any of the previous or following features, wherein saving the current stack trace as the callback stack trace includes attaching the current stack trace to previously saved callback stack trace.

A fifth feature, combinable with any of the previous or following features, wherein the operations include determining whether a registered callback is called; in response to determining that the registered callback is called by an asynchronous JavaScript function, determining whether a callback stack trace of the registered callback is available; and in response to determining that the callback stack trace of the registered callback is available, setting the callback stack trace as active by associating the callback stack trace with the asynchronous JavaScript function.

A sixth feature, combinable with any of the previous or following features, wherein the operations include determining whether a registered callback is ended; in response to determining that the registered callback is ended, determining whether the callback stack trace is active; and in response to determining that the callback stack trace is active, discarding saved stack trace of the registered callback that is ended.

In a third implementation, a computer-implemented system, including: a computer memory; and a hardware processor interoperably coupled with the computer memory and configured to perform operations. The operations include determining whether time-based sampling is activated to capture a time-based sampling data during execution of a JavaScript function; in response to determining that the time-based sampling is activated to capture the time-based sampling data, determining whether a callback stack trace is active; in response to determining that the callback stack trace is active, loading the callback stack trace; retrieving a current stack trace of the JavaScript function; and saving the loaded callback stack trace and the current stack trace of the JavaScript function as the time-based sampling data.

The foregoing and other described implementations can each, optionally, include one or more of the following features:

A first feature, combinable with any of the following features, wherein the JavaScript function includes an asynchronous function execute in a Node.js system A second feature, combinable with any of the previous or following features, wherein the operations include in response to determining that the callback stack trace is not active, skipping loading the callback stack trace.

A third feature, combinable with any of the previous or following features, wherein the operations include determining whether a new callback is registered during the execution of the JavaScript function; and in response to determining that the new callback is registered during the execution of the JavaScript function, saving a current stack trace as the callback stack trace.

A fourth feature, combinable with any of the previous or following features, wherein saving the current stack trace as the callback stack trace includes attaching the current stack trace to previously saved callback stack trace.

A fifth feature, combinable with any of the previous or following features, wherein the operations include determining whether a registered callback is called; in response to determining that the registered callback is called by an asynchronous JavaScript function, determining whether a callback stack trace of the registered callback is available; and in response to determining that the callback stack trace of the registered callback is available, setting the callback stack trace as active by associating the callback stack trace with the asynchronous JavaScript function.

A sixth feature, combinable with any of the previous or following features, wherein the operations include determining whether a registered callback is ended; in response to determining that the registered callback is ended, determining whether the callback stack trace is active; and in response to determining that the callback stack trace is active, discarding saved stack trace of the registered callback that is ended.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   determining whether time-based sampling is activated to capture a time-based sampling data during execution of a JavaScript function, wherein the JavaScript function comprises an asynchronous function execute in a Node.js system; and
   in response to determining that the time-based sampling is activated:
      determining whether a callback stack trace is active;
      in response to determining that the callback stack trace is active:
         loading an active callback stack trace; and
         providing the active callback stack trace and a current stack trace of the JavaScript function as the time-based sampling data.

2. The computer-implemented method of claim 1, comprising:
   in response to determining that the time-based sampling is activated and that the callback stack trace is not active:
      providing the current stack trace of the JavaScript function as the time-based sampling data.

3. The computer-implemented method of claim 1, comprising:
   in response to determining that the time-based sampling is not activated:
      determining whether a new callback is registered during the execution of the JavaScript function; and
      in response to determining that the new callback is registered during the execution of the JavaScript function, saving the current stack trace as the callback stack trace.

4. The computer-implemented method of claim 3, wherein saving the current stack trace as the callback stack trace comprises attaching the current stack trace to previously saved callback stack trace.

5. The computer-implemented method of claim 1, comprising:
   in response to determining that the time-based sampling is not activated:
      determining whether a new callback is registered during the execution of the JavaScript function; and
      in response to determining that the new callback is not registered during the execution of the JavaScript function:
         determining whether a registered callback is called;
         in response to determining that the registered callback is called by an asynchronous JavaScript function, determining whether the callback stack trace of the registered callback is available; and
         in response to determining that the callback stack trace of the registered callback is available, setting the callback stack trace as active by associating the callback stack trace with the asynchronous JavaScript function.

6. The computer-implemented method of claim 1, comprising:
   in response to determining that the time-based sampling is not activated:
      determining whether a new callback is registered during the execution of the JavaScript function; and
      in response to determining that the new callback is not registered during the execution of the JavaScript function:
         determining whether a registered callback is called;
         in response to determining that the registered callback is not called by an asynchronous JavaScript function:
            determining whether a registered callback is ended;
            in response to determining that the registered callback is ended, determining whether the callback stack trace is active; and
            in response to determining that the callback stack trace is active, discarding saved stack trace of the registered callback that is ended.

7. A non-transitory, computer-readable medium storing one or more instructions executable by a computer system to perform operations comprising:
   determining whether time-based sampling is activated to capture a time-based sampling data during execution of a JavaScript function, wherein the JavaScript function comprises an asynchronous function execute in a Node.js system; and
   in response to determining that the time-based sampling is activated:
      determining whether a callback stack trace is active;
      in response to determining that the callback stack trace is active:
         loading an active callback stack trace; and
         providing the active callback stack trace and a current stack trace of the JavaScript function as the time-based sampling data.

8. The non-transitory, computer-readable medium of claim 7, comprising:
   in response to determining that the time-based sampling is activated and that the callback stack trace is not active:
      providing the current stack trace of the JavaScript function as the time-based sampling data.

9. The non-transitory, computer-readable medium of claim 7, wherein the operations comprise:
   in response to determining that the time-based sampling is not activated:
      determining whether a new callback is registered during the execution of the JavaScript function; and
      in response to determining that the new callback is registered during the execution of the JavaScript function, saving the current stack trace as the callback stack trace.

10. The non-transitory, computer-readable medium of claim 9, wherein saving the current stack trace as the callback stack trace comprises attaching the current stack trace to previously saved callback stack trace.

11. The non-transitory, computer-readable medium of claim 7, wherein the operations comprise:
  in response to determining that the time-based sampling is not activated:
    determining whether a new callback is registered during the execution of the JavaScript function; and
    in response to determining that the new callback is not registered during the execution of the JavaScript function:
      determining whether a registered callback is called;
      in response to determining that the registered callback is called by an asynchronous JavaScript function, determining whether the callback stack trace of the registered callback is available; and
      in response to determining that the callback stack trace of the registered callback is available, setting the callback stack trace as active by associating the callback stack trace with the asynchronous JavaScript function.

12. The non-transitory, computer-readable medium of claim 7, wherein the operations comprise:
  in response to determining that the time-based sampling is not activated:
    determining whether a new callback is registered during the execution of the JavaScript function; and
    in response to determining that the new callback is not registered during the execution of the JavaScript function:
      determining whether a registered callback is called;
      in response to determining that the registered callback is not called by an asynchronous JavaScript function:
        determining whether a registered callback is ended;
        in response to determining that the registered callback is ended, determining whether the callback stack trace is active; and
        in response to determining that the callback stack trace is active, discarding saved stack trace of the registered callback that is ended.

13. A computer-implemented system, comprising:
  a computer memory; and
  a hardware processor interoperably coupled with the computer memory and configured to perform operations comprising:
    determining whether time-based sampling is activated to capture a time-based sampling data during execution of a JavaScript function, wherein the JavaScript function comprises an asynchronous function execute in a Node.js system; and
    in response to determining that the time-based sampling is activated:
      determining whether a callback stack trace is active;
      in response to determining that the callback stack trace is active:
        loading an active callback stack trace; and
        providing the active callback stack trace and a current stack trace of the JavaScript function as the time-based sampling data.

14. The computer-implemented system of claim 13, comprising:
  in response to determining that the time-based sampling is activated and that the callback stack trace is not active:
    providing the current stack trace of the JavaScript function as the time-based sampling data.

15. The computer-implemented system of claim 13, wherein the operations comprise:
  in response to determining that the time-based sampling is not activated:
    determining whether a new callback is registered during the execution of the JavaScript function; and
    in response to determining that the new callback is registered during the execution of the JavaScript function, saving the current stack trace as the callback stack trace.

16. The computer-implemented system of claim 13, wherein the operations comprise:
  in response to determining that the time-based sampling is not activated:
    determining whether a new callback is registered during the execution of the JavaScript function; and
    in response to determining that the new callback is not registered during the execution of the JavaScript function:
      determining whether a registered callback is called;
      in response to determining that the registered callback is called by an asynchronous JavaScript function, determining whether the callback stack trace of the registered callback is available; and
      in response to determining that the callback stack trace of the registered callback is available, setting the callback stack trace as active by associating the callback stack trace with the asynchronous JavaScript function.

17. The computer-implemented system of claim 13, wherein the operations comprise:
  in response to determining that the time-based sampling is not activated:
    determining whether a new callback is registered during the execution of the JavaScript function; and
    in response to determining that the new callback is not registered during the execution of the JavaScript function:
      determining whether a registered callback is called;
      in response to determining that the registered callback is not called by an asynchronous JavaScript function:
        determining whether a registered callback is ended;
        in response to determining that the registered callback is ended, determining whether the callback stack trace is active; and
        in response to determining that the callback stack trace is active, discarding saved stack trace of the registered callback that is ended.

* * * * *